June 12, 1928. Re. 16,991
C. T. NEITZEL
WELL TESTING TOOL
Original Filed Feb. 14, 1927
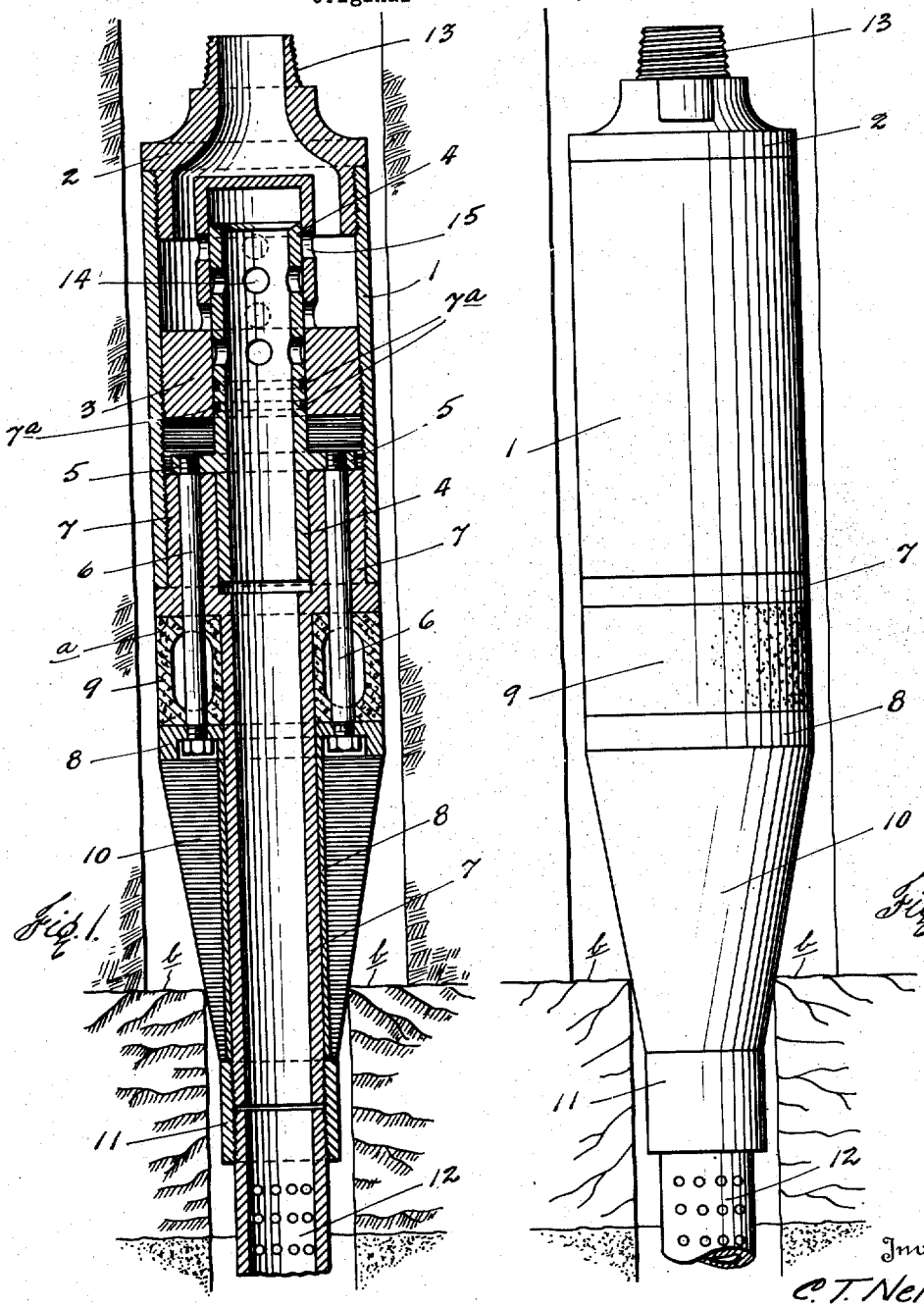
Inventor
C. T. Neitzel
By Jack Athey
Attorney Reissued June 12, 1928.

Re. 16,991

UNITED STATES PATENT OFFICE.

CONRAD T. NEITZEL, OF DALLAS, TEXAS, ASSIGNOR TO BRODIE H. ASHBY, OF DALLAS, TEXAS.

WELL-TESTING TOOL.

Original No. 1,625,140, dated April 19, 1927, Serial No. 167,910, filed February 14, 1927. Application for reissue filed June 28, 1927. Serial No. 202,150.

This invention relates to rotary well tools and equipment and it has particular reference to a new and useful tool designed for the purpose of obtaining tests of sands and mineral strata principally in drilling oil wells, and its chief object resides in the provision of equipment by which to determine the nature and characteristics of the strata encountered, and whether or not it possesses such value as to justify the installation of casing.

The invention further comprehends a tool of the character designated which may be substituted for the drill bit, in cases where sand tests are required, and lowered into the hole without the usual waste of time and otherwise expensive procedure of setting up casing, the latter not infrequently proving to be of no value whatever.

Another object of the invention resides in the provision of a double seat, their joint function being positively effective in shutting off all fluid tending to rise above the tool, and forcing the same to pass through the tool into the drill pipe, there to be trapped and used as a sample.

Yet another object of the invention resides in its apparent simplicity of construction and operation, its operative parts being but few and those subjected to wear being capable of interchangeability when necessary.

With these foremost objects in view, the invention has further reference to its salient features of construction and operation of parts, as well as certain other objects and advantages not hereto set forth, which will be manifested in the following detail description and illustrated in the accompanying drawings, wherein:

Figure 1 represents a side elevational view of the invention in operative position within a well, shown in axial cross-section, and Figure 2 is a side elevational view in a similar position.

Proceeding now more in detail with the drawing, it may be first stated for the purpose of setting out in a comprehensive manner the improvement contemplated, that heretofore, when a driller encounters what appears to be "pay sand" he is first required to pull the drill pipe assembly, re-enter the hole with a smaller bit to create a shoulder therein to support a string of casing, which is in turn run into the hole. The drill pipe is then used for washing the sand, and during the process of making such a test, the drill pipe assembly is required to be removed in order to bail out the well. A tubing assembly is usually substituted for the drill pipe, having a working barrel attached in which is contained a valve assembly. In addition to the equipment described, the usual sucker rod assembly is necessary to pump the fluid to the ground surface for a test. Should the test prove of no consequence, drilling to a greater depth must be resumed.

Referring now particularly to Figure 1 of the drawings, the invention is shown as being provided with a valve casing 1 externally threaded to the head 2, which, in turn is threadedly attached to the drill stem assembly, not shown.

The valve casing 1 is provided with interior threads near its lower end for the purpose of supporting the valve head 3, through which slides the valve stem 4, the latter having a central flange 5 into which is threaded the ends of a series of connecting pins 6. These pins pass unrestrictedly through the valve stem guide 7, and while the latter is shown as a single piece, it is of course apparent that its reduced lower end may be detachable if desired to simplify assembly.

As apparent in Figure 1, the valve stem 4 is supplied with expansion rings $7^a$ for the purpose of maintaining a constant friction on the inner surface of the valve head 3, to take up all possible wear, and further to provide for the substitution of parts should the wear render the same impractical for further use. Moreover, the top of the valve stem 4 is inwardly deflected as a precaution against the accumulation of sand or other such substance thereabove.

The pins 6 are bolted at their lower ends to a bushing 8 surrounding the lower end of the valve guide 7. Interposed between the shoulder *a* of the valve guide 7 and bushing 8 is a compressible annular cushion or packer 9, to which reference will be later made during a description of operation.

Surrounding the bushing 8 is a conical shaped member 10, composed preferably of fibre, or any equivalent material of tough consistency and capable of considerable hard usage, since this member is subjected to great strain. The cone 10 and bushing are held against downward displacement by a coupling 11 threaded upon the lower end of the valve guide 7 which provides a connection for the perforated sections of pipe or anchor 12.

In operation, a shoulder *b* is formed in the hole, usually by the use of a small drill bit, after which the tool is substituted for the drill bit by screwing the neck 13 therein, much in the same manner as a drill bit. The tool is then lowered into the hole until the cone 10 strikes the shoulder *b*.

The resiliency of the cone together with the yieldability of the earthen shoulder *b* forms a packing practically impenetrable by the fluid and sand below the shoulder.

The weight of the drill stem assembly is imposed upon the tool and consequently upon the cone 10 which rests upon the shoulder *b*, whereby the guide 7 is caused to slide downward within the bushing 8. This downward movement of the guide, through its enlargement, compresses the cushion or packer 9 which is caused to seek space beyond the periphery of the tool body, and the fluid, if any, rising by reason of an improper seating of the cone 10 is constrained against passage by the bulging of the cushion or packer 9 against the well wall. This forms a double packing as a precaution against escape of any fluid above the tool.

The downward movement of the casing 1 with the guide 7, whereby the annular cushion or packer 9 is compressed, also causes a downward movement of the guide 7 relative to the pins 6, which are held stationary by the bushing 8. The valve stem 4 is thus supported against movement and the head 3 being attached to the casing is caused to slide downwardly on the stem, whereby its ports 15 are caused to register with ports 14 in the stem, consequently creating a free passage for the fluid and sand through the ports in the pipe 12 upward to a level above the head, where it is entrapped by an upward movement of the tool.

Upon an upward movement of the tool, the casing 1 will be lifted, thus taking the weight off of the cushion or packer 9, which will expand vertically and thus exert a downward force upon the bushing 8 and cone 10, with the result that the cone will be held on the shoulder *b* and the guide 7 will move upwardly with the casing 1 and head 3, thereby closing the ports 14 and 15 and returning the parts to their normal inoperative positions.

The tool may be elevated to the ground surface, and a test made of the sand trapped within the drill pipe above the tool.

Should the test prove the strata to be of no value, it is necessary only to substitute the drill for the tool, lower into the hole and resume the drilling operation, preparatory to another test, without the usual waste of time encountered as hereinbefore set forth.

It will be observed that by the use of the sliding valve 3, adherence of substances to the walls of the valve head is positively prevented, which might otherwise render the valve inoperative for the purposes intended as in most types of valves used in a similar manner. This feature is augmented by reason of the deflected upper end of the valve stem. The valve stem is further rendered leak proof, as a preventive against seeping back into the hole the fluid entrapped above the valve, by the interpositioning of the packing rings $7^a$ intermediate and on either side of the valve ports, as shown.

Manifestly, the construction shown is capable of considerable variation, and such variation as is in keeping with the appended claims is considered within the spirit of the invention.

I claim:

1. A sand testing tool including a casing containing a valve and a sliding valve head guided upon the valve, each having ports adapted to register; a conical seating member below said valve and connected therewith; an annular compressible cushion intermediate said valve and seating member to yield to a downward movement of the valve head to register said ports, and means to permit passage of fluid through said ports to be trapped above the valve when closed.

2. A sand testing tool including a valve and a sliding valve head confined within a casing, each having ports; a conical seating member below said casing arranged to restrict the passage of fluid exteriorly of the latter, and connected with the valve; a compressible cushion disposed intermediate said valve head and seating member adapted to yield to the movement of the former when seated to register said ports, and means to permit ingress of sand and fluid to thereby trap the same above said valve.

3. A well testing tool including a sliding valve head and a valve confined within a casing, each having ports; a conical seating member below said casing having supporting connection with the valve, the casing being capable of limited movement relatively of the seating member, a compressible member intermediate said valve head and the seating member yielding to the action of said valve head when said member is seated to aline the ports in said head and said valve, and means to permit the ingress of fluid into said tool to be trapped above said valve head when released.

4. A well testing tool including a valve head and valve confined within a casing, each having ports capable of alinement; a seating member below said casing having connection with said valve for supporting it to effect alinement of said ports when seated; a compressible member interposed between said valve head and seating member adapted to yield to a downward movement of the valve head when the seating member is seated, and means to permit of the entrance of fluid to permit the same to pass above the valve head and be thereby trapped when the parts are released.

5. A well testing tool including a valve head and valve, each having ports capable of alinement; a seating member having connection with said valve to support the same when the valve head is actuated to effect an alinement of said ports; a separate compressible side wall packing member arranged intermediate said valve head and said seating member to yield to the movement of the former, and a perforated fluid receiving pipe below said seating member.

6. An apparatus of the character described including a relatively stationary valve member having ports and a sliding valve head having ports alineable with the ports of the valve member; a member below the valve member supporting the valve member; the body of said lower member being substantially cone shaped; means to cause a downward movement of the valve head to aline the ports of said head and the valve member, and means to permit passage of fluid through said ports to entrap the same above the valve head when the latter is closed.

7. In a well testing tool, a casing, a packing member depending therefrom and provided with a fluid passage therethrough, a valve controlling said passage and positively operable incident to the engagement of said member with a wall of a well bore, and a separate side wall packer interposed between the casing and packing member for expansion in the valve operation.

8. A sand testing tool including a casing containing a valve and a sliding valve head guided upon the valve, each having ports adapted to register; a base packing member below said valve and operatively connected therewith; a side wall packing intermediate said valve and base packing to yield to a downward movement of the valve head to register said ports, and means to permit passage of fluid through said ports to be trapped above the valve when closed.

9. In a well testing tool, a casing having a ported valve member for admitting fluid from below, a telescoping ported valve for closing the valve port of the casing to trap fluid above said valve, a seating packing member carried by the casing for engaging the bottom of a well and connected to open said valve in the downward movement of said valve member, and a side wall packer above the seating member arranged to be expanded into engagement with the side wall of a well when the seating member is in contact with the bottom of a well.

In testimony whereof I affix my signature.

CONRAD T. NEITZEL.